US012260973B2

(12) United States Patent
Chen et al.

(10) Patent No.: US 12,260,973 B2
(45) Date of Patent: Mar. 25, 2025

(54) CONDUCTIVE ROD AND LAMP INCLUDING THE CONDUCTIVE ROD

(71) Applicant: Radiant Opto-Electronics Corporation, Kaohsiung (TW)

(72) Inventors: Chung-Kuang Chen, Kaohsiung (TW); Guo-Hao Huang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 385 days.

(21) Appl. No.: 17/746,063

(22) Filed: May 17, 2022

(65) Prior Publication Data

US 2022/0328211 A1 Oct. 13, 2022

Related U.S. Application Data

(63) Continuation of application No. PCT/CN2021/084508, filed on Mar. 31, 2021.

(51) Int. Cl.

| | |
|---|---|
| ***H01B 5/04*** | (2006.01) |
| ***F21V 17/12*** | (2006.01) |
| ***F21V 21/002*** | (2006.01) |
| ***F21V 23/00*** | (2015.01) |

(52) U.S. Cl.

CPC ............... *H01B 5/04* (2013.01); *F21V 17/12* (2013.01); *F21V 21/002* (2013.01); *F21V 23/002* (2013.01)

(58) Field of Classification Search

CPC ......... H01B 5/04; F21V 17/12; F21V 21/002; F21V 23/002; F21V 21/06; F21V 21/00; F21V 15/01; F21V 17/00; F21V 21/12; F21V 23/06; F21S 6/002; F21S 6/005; H01R 33/22

USPC ........ 174/68.1, 68.3, 40 R, 45 R, 493, 88 R, 174/70 C; 248/49, 56, 68.1

See application file for complete search history.

(56) References Cited

U.S. PATENT DOCUMENTS

| | | | | |
|---|---|---|---|---|
| 1,930,926 | A | 10/1933 | Doane | |
| 3,257,496 | A * | 6/1966 | Douglas | F21V 23/00 174/45 R |
| 5,586,742 | A * | 12/1996 | Carter | F21V 21/0824 52/156 |

(Continued)

FOREIGN PATENT DOCUMENTS

| | | |
|---|---|---|
| CN | 2267387 Y | 11/1997 |
| CN | 2588198 Y | 11/2003 |

(Continued)

*Primary Examiner* — Angel R Estrada

(57) ABSTRACT

A conductive rod includes an outer tube unit, at least one insulating member, and a conductive unit. The outer tube unit is made of conductive material, and has a first end and a second end, the first end and the second end are communicated with a tube space. The insulating member is disposed on the first end of the outer tube unit. One end of the conductive unit is positioned on the insulating member, and the other end of the conductive unit extends toward the second end along the tube space of the outer tube unit. The conductive unit is not in contact with the outer tube unit. The present invention also provides a lamp, comprising at least one conductive rod as described above, a lamp holder combined with a top end of the conductive rod, and a base combined with a bottom end of the conductive rod.

12 Claims, 10 Drawing Sheets

(56) References Cited

U.S. PATENT DOCUMENTS

| | | | | |
|---|---|---|---|---|
| 6,135,622 | A * | 10/2000 | Downing ................ F21V 21/06 362/411 |
| 7,765,770 | B2 * | 8/2010 | Fournier ............. E04H 12/2253 52/843 |
| 8,454,210 | B2 * | 6/2013 | Gu ........................ F21V 23/002 362/411 |
| 2004/0190306 | A1 | 9/2004 | Wu |
| 2015/0070878 | A1 | 3/2015 | Yu |
| 2019/0162397 | A1 | 5/2019 | Sonneman et al. |

FOREIGN PATENT DOCUMENTS

| | | | |
|---|---|---|---|
| CN | 201129676 | Y | 10/2008 |
| CN | 202476005 | U | 10/2012 |
| CN | 202733819 | U | 2/2013 |
| CN | 208025464 | U | 10/2018 |
| CN | 209431361 | U | 9/2019 |
| CN | 211551452 | U | 9/2020 |
| CN | 212056800 | U | 12/2020 |
| TW | M258002 | | 3/2005 |
| WO | 2020073638 | A1 | 4/2020 |
| WO | 2020151720 | A1 | 7/2020 |

* cited by examiner

CONDUCTIVE ROD AND LAMP INCLUDING THE CONDUCTIVE ROD

RELATED APPLICATIONS

This application is a continuation application of International Application No. PCT/CN2021/084508, filed on, Mar. 31, 2021. The entire disclosures of all the above applications are hereby incorporated by reference.

FIELD OF THE INVENTION

The present invention relates to a lighting device, and especially to a lamp and its conductive rod that are easy to assemble.

BACKGROUND OF THE INVENTION

If a table lamp or a standing lamp has been assembled, the volume of the packaging is usually quite large, which is not only difficult to transport, but also increases the shipping cost.

Taking the standing lamp as an example, if the consumer needs to assemble it by himself after purchasing, he needs to insert the wires into at least one rod by himself, and the assembly is not easy. If the wire does not need to be penetrated the rod and is exposed outside, it will not only affect the visual appearance, but also have the danger of being pulled over. Therefore, it is necessary to provide a lamp that meets the market demand.

SUMMARY OF THE INVENTION

One object of the present invention is to provide a conductive rod that can be assembled quickly and conveniently.

The conductive rod comprises an outer tube unit, at least one insulating member, and a conductive unit. The outer tube unit is made of conductive material and has a first end and a second end, wherein the first end and the second end communicate with a tube space. The at least one insulating member disposed at the first end of the outer tube unit. One end of the conductive unit is positioned on the insulating member, and the other end of the conductive unit extends toward the second end along the tube space of the outer tube unit, and the conductive unit is not in contact with the outer tube unit.

In a preferable embodiment, the insulating member has a sleeve portion and a blocking portion located at one end of the sleeve portion, wherein the sleeve portion forms an inner space around an axial direction, and the conductive unit extends into the inner space and is positioned on the insulating member.

In a preferable embodiment, the insulating member further has a groove portion recessed along a radial direction of the sleeve portion and the blocking portion.

In a preferable embodiment, the conductive unit includes a conductive strip with a stretched section and at least one positioning section connected to an end of the stretched section, wherein the stretched section of the conductive strip passes through the groove portion of the insulating member so that the positioning section is positioned on the blocking portion, and the end of the positioning section protrudes from the insulating member along the axial direction of the sleeve portion.

In a preferable embodiment, the positioning section of the conductive strip has a neck portion connected to the stretching section, and a tapered portion connected to the neck portion and protruding from the insulating member, wherein the diameter of the neck portion is smaller than the maximum diameter of the tapered portion, the neck portion penetrates the groove portion, and the tapered portion abuts against the blocking portion and tapers away from the neck portion to form a tapered shape.

In a preferable embodiment, the conductive unit further includes at least one conductive sheet, the blocking portion of the insulating member has at least one positioning hole, and the conductive sheet is inserted into the positioning hole and a part of the conductive sheet is exposed on the blocking portion.

In a preferable embodiment, the conductive strip has a stretched section and a positioning section connected to one end of the stretched section, wherein the conductive sheet has a first penetrating section extending through the positioning hole, and a connecting section bent from the first penetrating section and positioned at the blocking portion, the first penetrating section has a hole, and the positioning section of the conductive strip is hooked through the hole of the first penetrating section.

In a preferable embodiment, the blocking portion of the insulating member has another positioning hole, the conductive sheet further has a second penetrating section bent from the connecting section and extending along the same direction as the first penetrating section, wherein the first penetration section and the second penetration section pass through the two positioning holes respectively.

In a preferable embodiment, the outer tube unit includes a hollow tube body, and at least one positioning member disposed on the hollow tube body, wherein the insulating member further has a protruding wall portion extending outward along the radial direction of the blocking portion, the insulating member is combined with the positioning member, and the protruding wall portion abuts against the positioning member.

In a preferable embodiment, the hollow tube body is formed with an inner thread, and the positioning member is formed with an outer thread, and the positioning member is able to adjust its position relative to the hollow tube body by screwing in the hollow tube body.

Another object of the present invention is to provide a lamp which comprises at least one conductive rod as described above, a lamp holder combined with a top of the conductive rod, and a base combined with a bottom of the conductive rod.

In a preferable embodiment, the lamp holder includes a first engaging portion which is detachably combined with one end of the outer tube unit and is made of conductive material, a first conductive portion located inside the first engaging portion and capable of being electrically connected to the conductive unit of the conductive rod, and a light-emitting portion electrically connected to the first engaging portion and the first conductive portion. The first engaging portion and the first conductive portion are not in contact with each other.

In a preferable embodiment, the base includes a second engaging portion which is detachably combined with one end of the outer tube unit and is made of conductive material, a second conductive portion located inside the second engaging portion and capable of being electrically connected to the conductive unit of the conductive rod, and a circuit board electrically connected to the second engaging portion and the second conductive portion. The second engaging portion and the second conductive portion are not in contact with each other.

Another object of the present invention is to provide a conductive series connection assembly for electrically connecting a first series connection unit and a second series connection unit. The first series connection unit comprises a first casing made of conductive material and having a first end, a first insulating member disposed on the first end of the first casing and having a blocking portion, and a first conductive member connected to the first insulating member and positioned on the blocking portion. The first conductive member is not in contact with the first casing. The second series connection unit comprises a second casing made of conductive material and having a second end, a second insulating member disposed on the second end of the second casing, and a second conductive member having a stretched section and at least one positioning section connected to the end of the stretched section. The end of the positioning section is connected to the second insulating member, and the second conductive member is not in contact with the second casing. The first insulating member located at the first end of the first casing is combined with the second end of the second casing, and a part of the first conductive member located on the blocking portion of the first insulating member is in contact with the positioning section of the second conductive member located at the second end of the second casing.

In a preferable embodiment, the second insulating member has a blocking portion, the positioning section of the second conductive member has a tapered portion, the tapered portion protrudes from the blocking portion of the second insulating member, and the blocking portion of the first insulating member presses the tapered portion of the second conductive member so that the tapered portion can be compressed.

The effect of the present invention is that the conductive rod can be conducted as long as it is combined with the base and the lamp holder, and the assembly is fast and convenient. Therefore, the lamp will not have exposed wires, and the detachable design can also reduce packaging volume and shipping costs.

DETAILED DESCRIPTION OF THE INVENTION

The detailed description and preferred embodiments of the invention will be set forth in the following content and provided for people skilled in the art to understand the characteristics of the invention.

Figure 1:
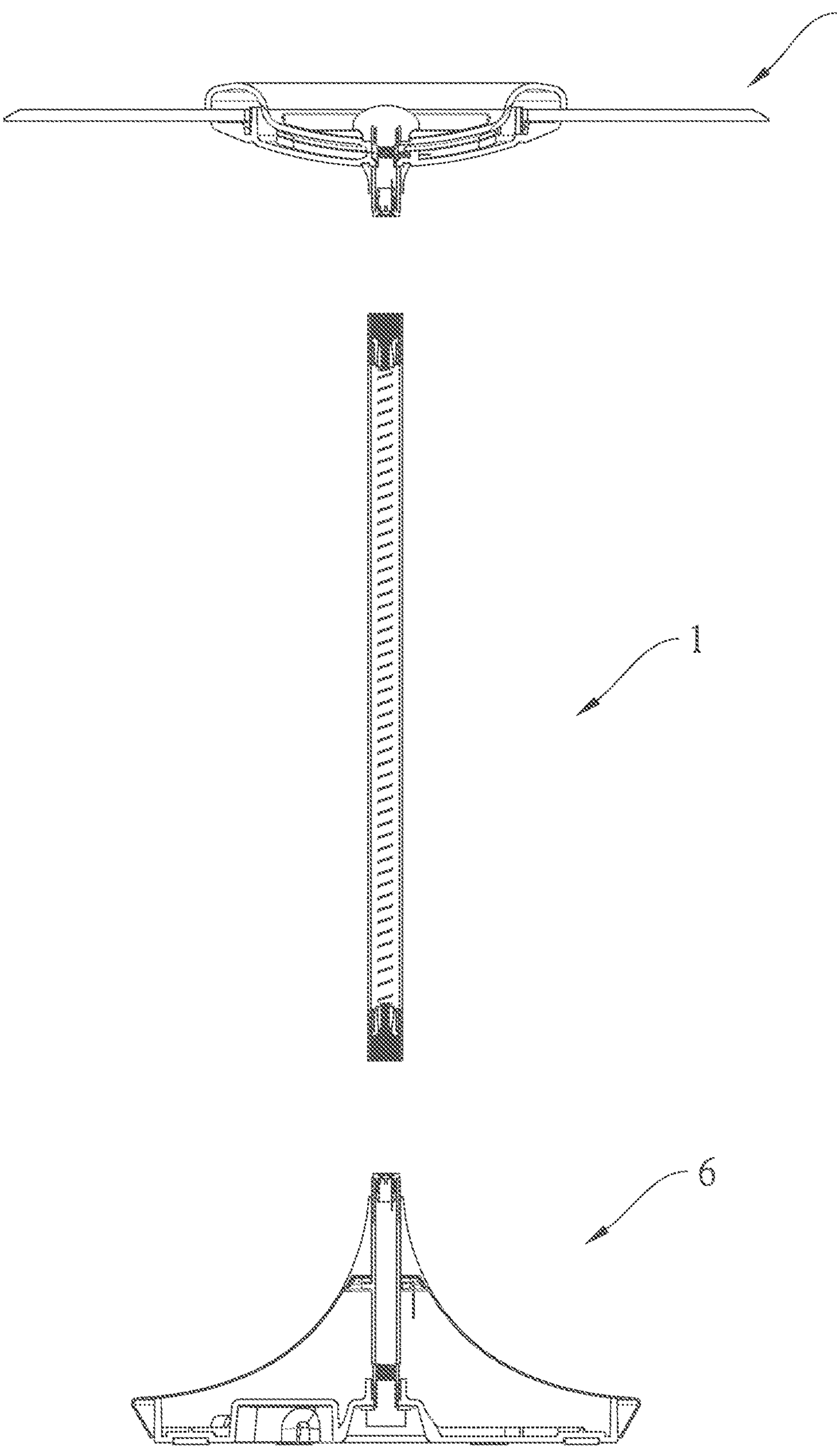
FIG. 1 is an exploded diagram of a lamp according to a first embodiment of this invention.

Referring to FIG. 1, it is the first preferred embodiment of the lamp of the present invention. The lamp comprises a conductive rod 1, a lamp holder 5 combined with a top of the conductive rod 1, and a base 6 combined with a bottom of the conductive rod 1. It should be noted that the lamp of the present invention is suitable for a low-voltage power supply. In another embodiment, the lamp of the present invention is able to combine a plurality of conductive rods 1 to increase the distance between the lamp holder 5 and the base 6.

Figure 2:
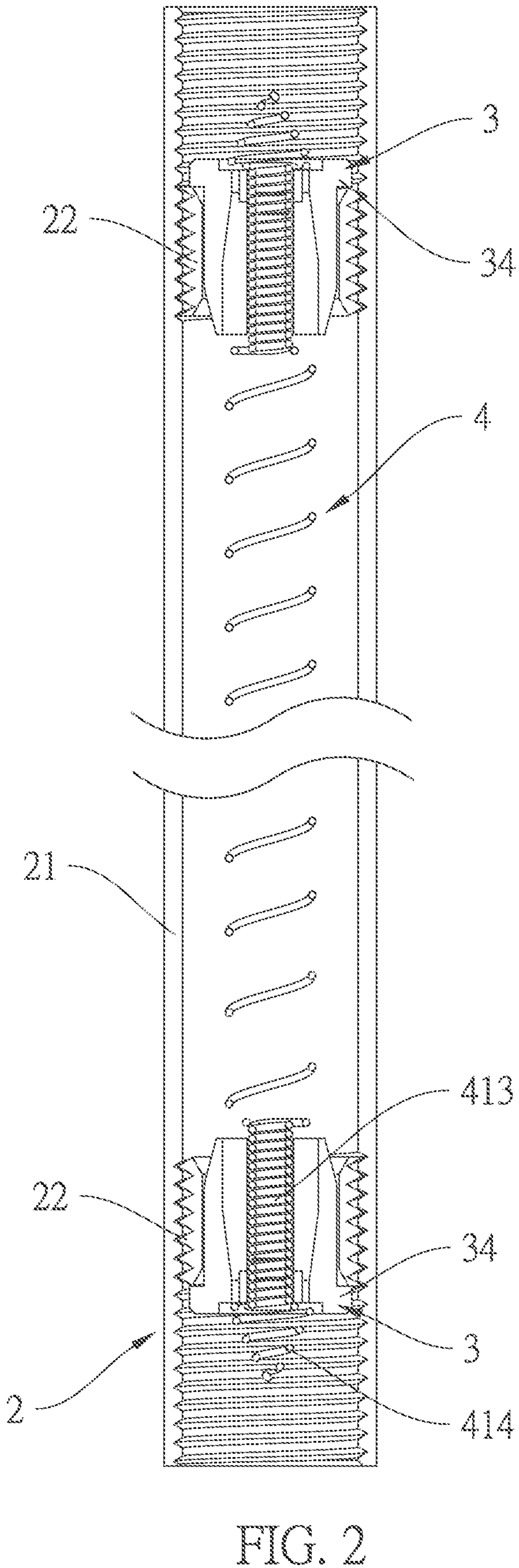
FIG. 2 is a cross-sectional diagram illustrating the structure of a conductive rod.

Referring to FIG. 2, the conductive rod 1 includes an outer tube unit 2 made of a conductive material, two insulating members 3 disposed at both ends of the outer tube unit 2 respectively, and a conductive unit 4 extending through the outer tube unit 2. The outer tube unit 2 includes a hollow tube body 21 surrounding a tube space, and two positioning members 22 disposed in the hollow tube body 21. The hollow tube body 21 includes a first end and a second end which is communicated with first end via the tube space. The insulating members 3 are combined with the two positioning members 22 respectively, such as the positioning members 22 in FIG. 2 which is independent of the hollow tube body 21. In another embodiment, the thickness of the wall of the hollow tube body 21 can also be used to form a flange, so that the insulating member 3 can be positioned on the hollow tube body 21. Both ends of the hollow tube body 21 include internal threads, the positioning members 22 include external threads, and the positioning members 22 are able to adjust their position relative to the hollow tube body 21 by screwing in the hollow tube body 21.

Figure 3:
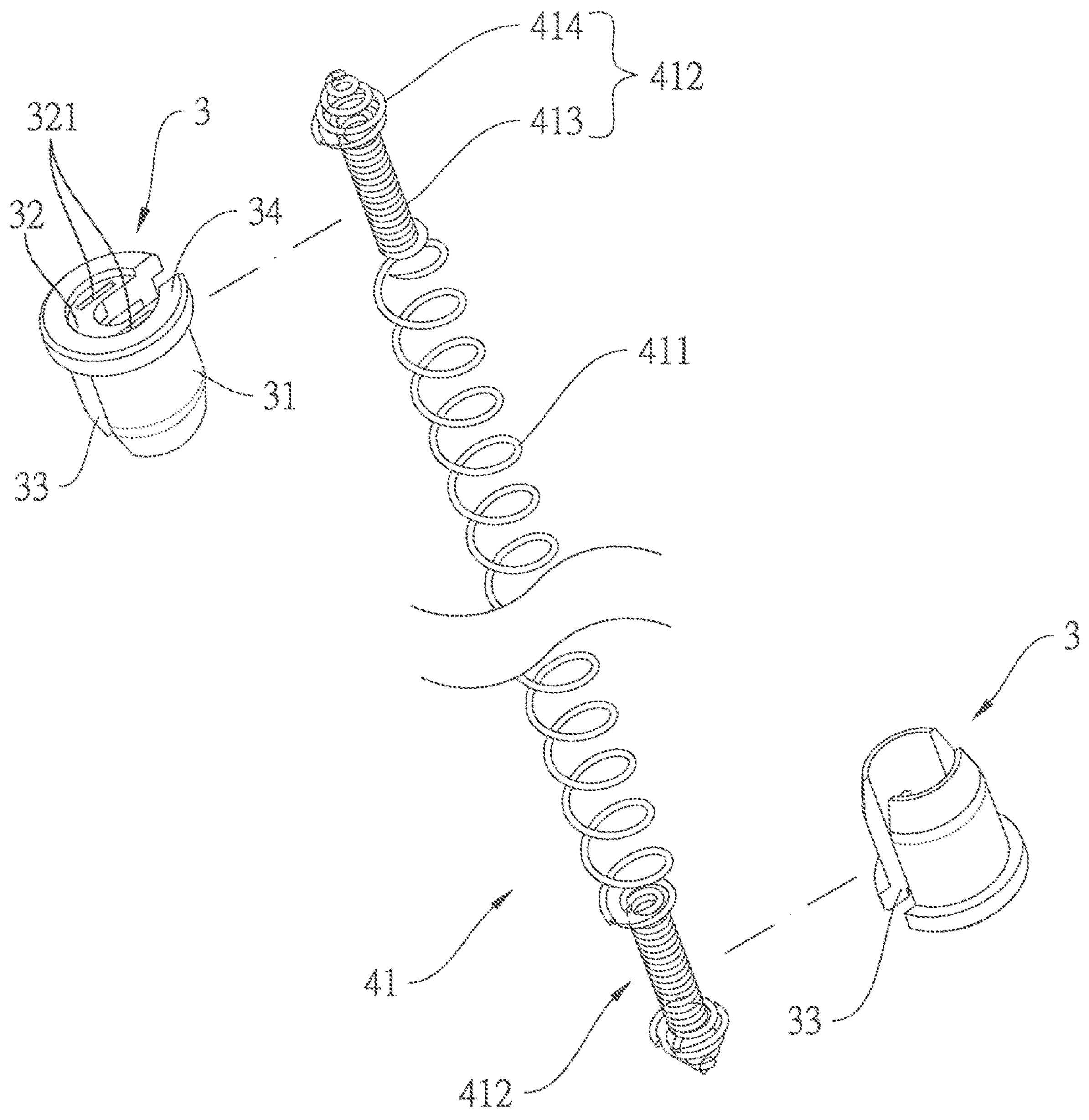
FIG. 3 is an exploded diagram illustrating the structure of a conductive strip and an insulating member.

Referring to FIG. 3, each of the insulating members 3 has a sleeve portion 31, a blocking portion 32 at one end of the sleeve portion 31, a groove portion 33 recessed along a radial direction of the sleeve portion 31 and the blocking portion 32, and a protruding wall portion 34 extending radially outward of the blocking portion 32. In addition, as shown in FIG. 2, each of the insulating members 3 abuts against the corresponding positioning member 22 with the protruding wall portion 34. That is to say, the insulating member 3 will not be disengaged from the positioning member 22 by the blocking of the protruding wall portion 34 thereof. In another embodiment, the blocking portion 32 of each insulating members 3 further has two positioning holes 321 to complete the electrical conduction of the lamp of the present invention, which will be described in detail later.

The conductive unit 4 includes a conductive strip 41 having a stretched section 411 and two positioning sections 412 connected to both ends of the stretched section 411 respectively. Wherein, the positioning section 412 of the conductive strip 41 abuts against the blocking portion 32 of the insulating member 3, so that the stretched section 411 of the conductive strip 41 extends through the hollow tube body 21 of the outer tube unit 2, and the positioning sections 412 located at both ends of the stretching section 411 are able to be positioned on the positioning members 22 of the outer tube unit 2 respectively by abutting against the blocking portions 32 of the insulating members 3. Each of the positioning sections 412 has a neck portion 413 connected to the stretched section 411, and a tapered portion 414 connected to the neck portion 413 and protruding from the insulating member 3. The diameter of the neck portion 413 is smaller than the maximum diameter of the tapered portion 414. The tapered portion 414 tapers away from the neck portion 413 to form a tapered shape.

Figure 4A:
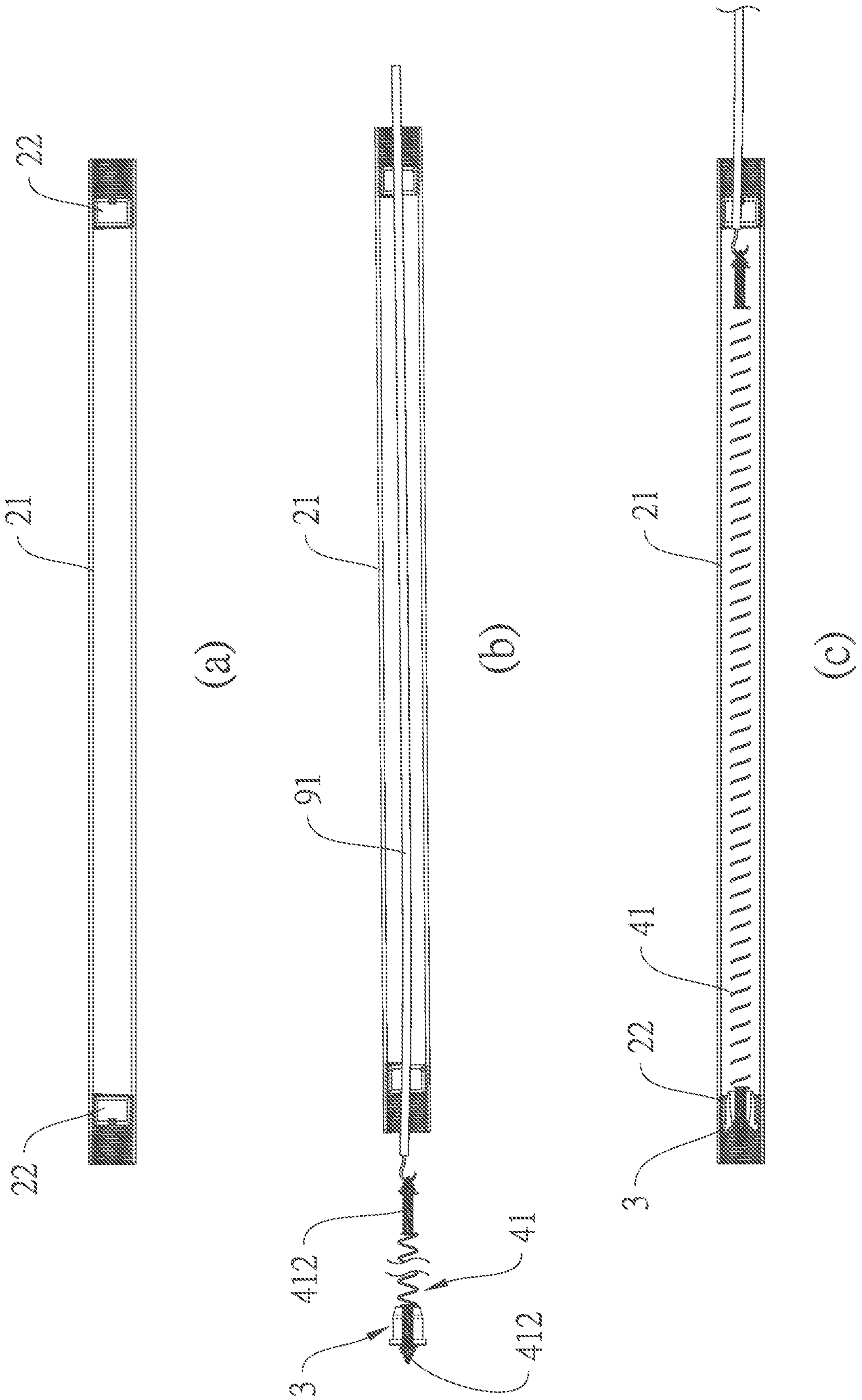
FIG. 4A is a flow chart illustrating the assembly procedure of the conductive rods.

Referring to FIG. 4A, the assembly procedure of the conductive strip 41 is described. It should be noted that, in this embodiment, the conductive strips 41 are expansion springs, but not limited to this. First, as shown in FIG. 4A(a), two positioning members 22 are screwed in two ends of the hollow tube body 21 respectively. Next, as shown in FIG. 4A(b), install one insulating member 3 at the positioning section 412 on the left side of the conductive strip 41. Referring to FIG. 2 and FIG. 3, the neck portion 413 of the positioning section 412 is inserted through the groove portion 33 of the insulating member 3, and the tapered portion 414 abuts against the blocking portion 32, so that the positioning section 412 can be positioned on the insulating member 3. After the positioning section 412 is assembled, the tapered portion 414 protrudes from the insulating member 3 along the axial direction of the sleeve portion 31.

Figure 4B:
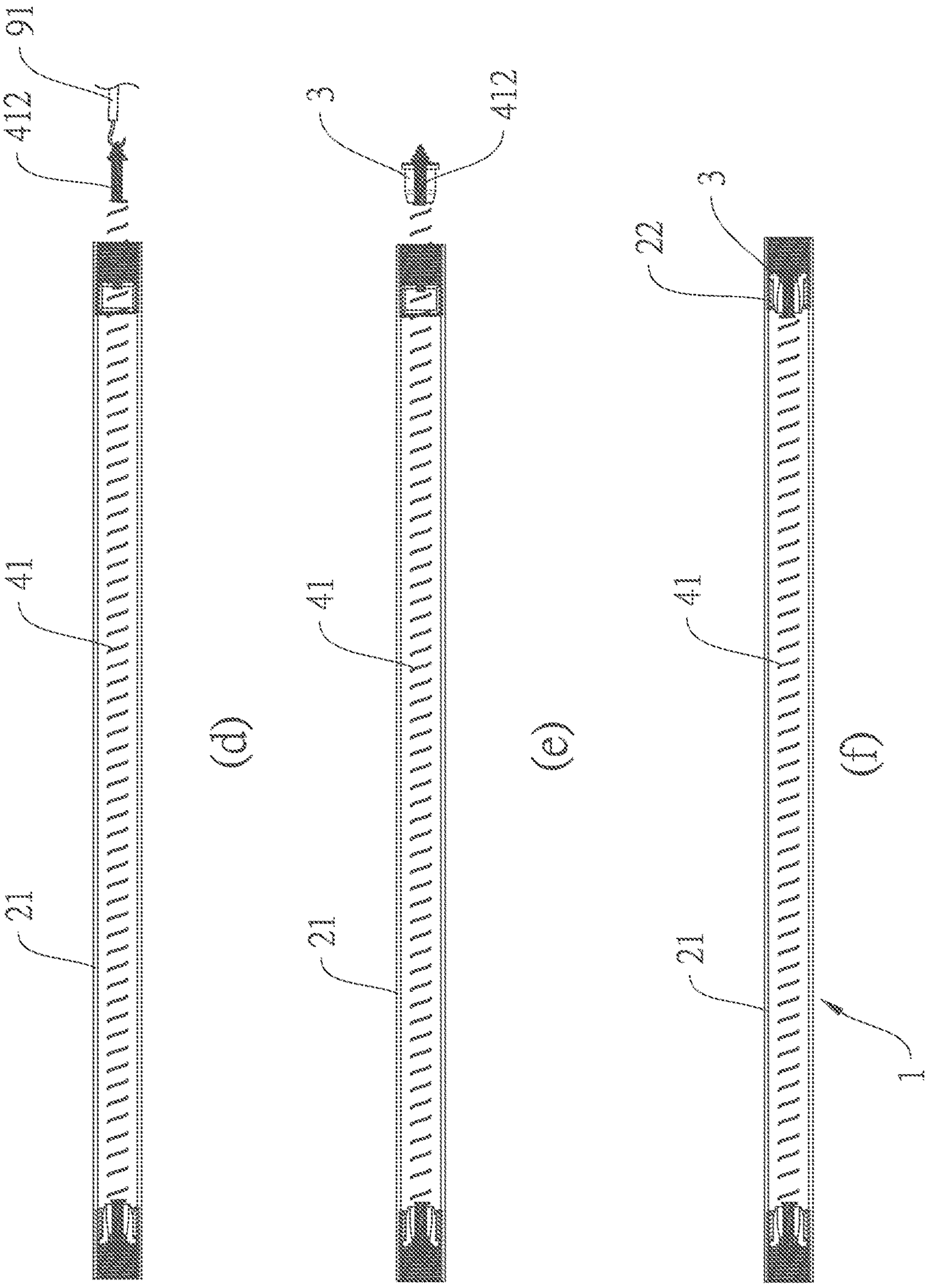
FIG. 4B is a flow chart which continuing from FIG. 4A to illustrate the assembly procedure of the conductive rods.

Referring to FIG. 4A(b), an operating tool 91 is passed through the hollow tube body 21 to hook the positioning section 412 on the right side of the conductive strip 41, and the operating tool 91 is pulled to guide the conductive strip 41 to enter the left side of the hollow tube body 21 and penetrate it. The conductive strip 41 is continuously pulled until the insulating member 3 disposed on the left side of the conductive strip 41 is engaged with the positioning member 22 on the left side of the hollow tube body 21, as shown in FIG. 4A(c). Referring to FIG. 4B(d), the operating tool 91 is pulled continuously to pull the positioning section 412 on the right side of the conductive strip 41 to the outside of the hollow tube 21. Referring to FIG. 4B(e), another insulating member 3 is disposed on the positioning section 412 on the right side of the conductive strip 41, and then the operating tool 91 is disassembled from the positioning section 412 on the right side of the conductive strip 41. The elastic restoring force of the conductive strip 41 will make the positioning section 412 on the right side of the conductive strip 41 return into the hollow tube body 21 and make the insulating member 3 stuck on the positioning member 22 on the right side of the hollow tube body 21, as shown in FIG. 4B(f), and the assembly of the conductive strip 41 is completed. The conductive strip 41 is in a nearly taut state in the stretching action during the assembly process, which can ensure that the conductive strips 41 will not contact the hollow tube body 21 to cause a short circuit. In this embodiment, the positioning members 22 are located inside the hollow tube body 21 and do not protrude from both ends of the hollow tube body 21. Therefore, after the two insulating members 3 are combined with the two positioning members 22, they are also located in the hollow tube body 21, so that both ends of the conductive rod 1 are designed as female engagement.

Figure 5:
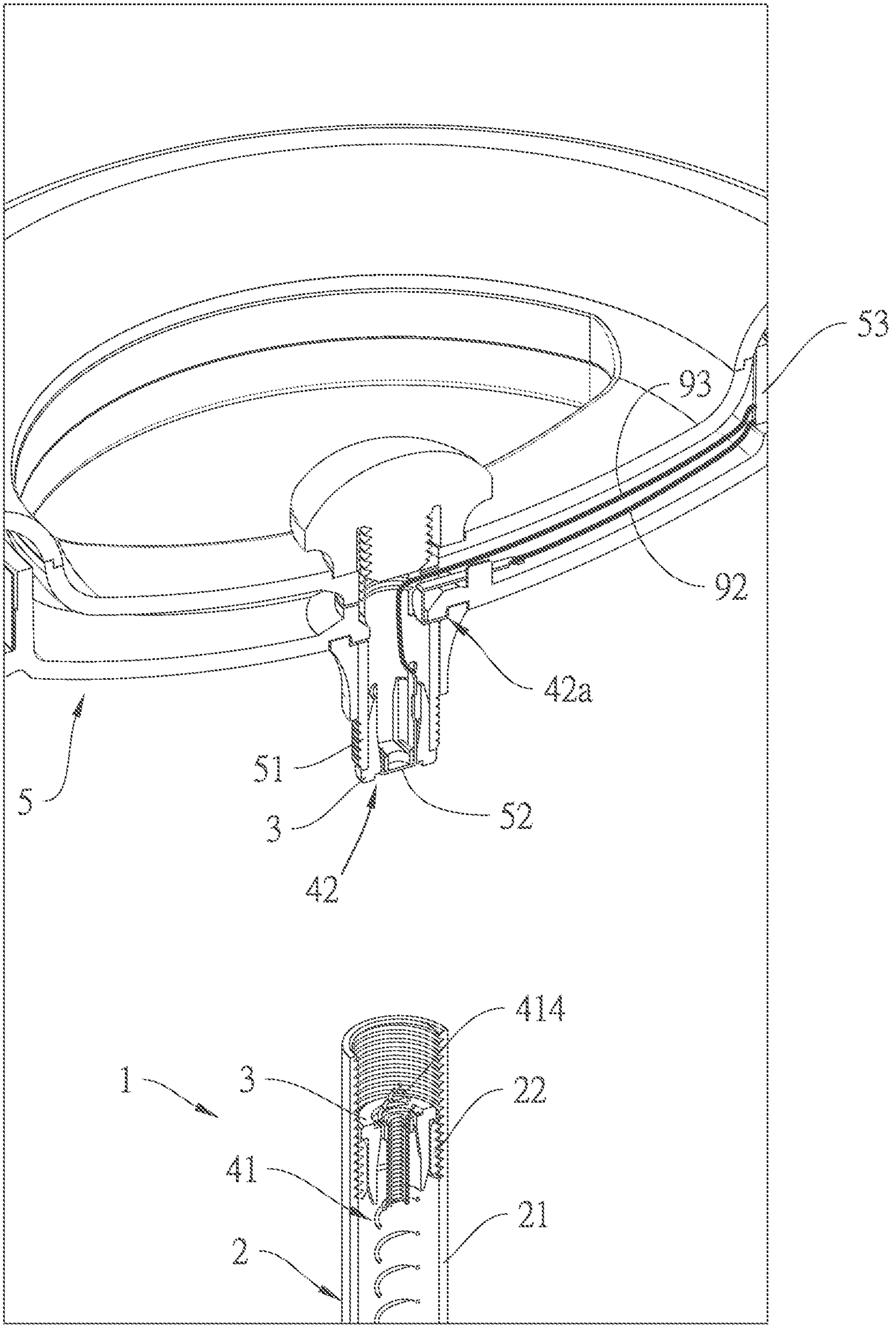
FIG. 5 is an exploded diagram illustrating the combination of the conductive rod and a lamp holder.
Figure 6:
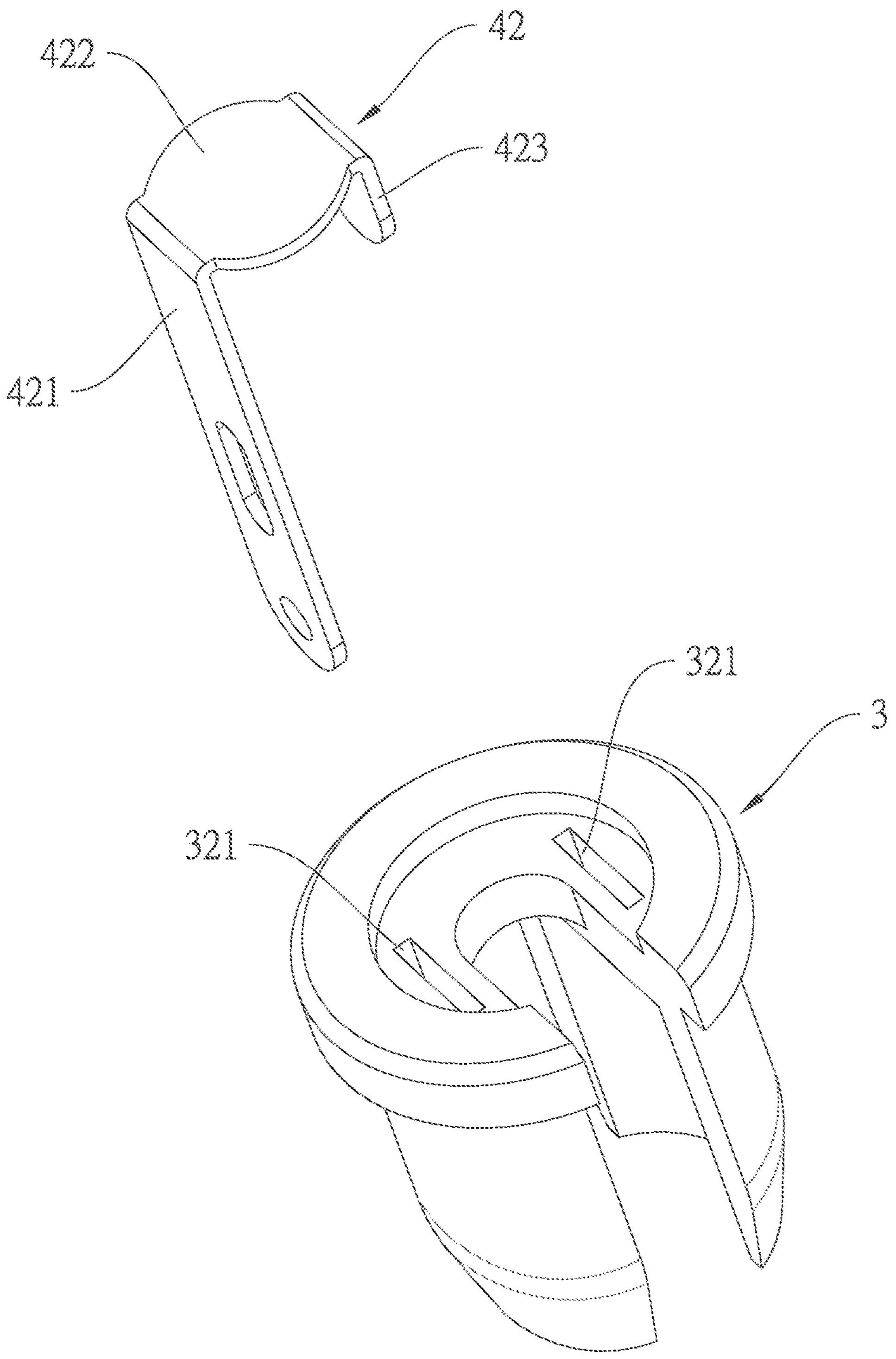
FIG. 6 is an exploded diagram illustrating the combination of the insulating member and a conductive sheet.

Referring to FIG. 5, the lamp holder 5 includes a first engaging portion 51 detachably connected to one end of the outer tube unit 2 and made of conductive material, a first conductive portion 52 located inside the first engaging portion 51, and a light-emitting portion 53 electrically connected to the first engaging portion 51 and the first conductive portion 52. The first engaging portion 51 and the first conductive portion 52 are not in contact with each other. In more detail, the first engaging portion 51 is a metal tube, and the end of the first engaging portion 51 is installed with the insulating member 3 aforementioned and a conductive sheet 42. Therefore, the first engaging portion 51 is not conductive with the first conductive portion 52 due to the insulating properties of the insulating member 3. Referring to FIG. 6, the conductive sheet 42 has a first penetrating section 421, a connecting section 422 bent from the first penetrating section 421, and a second penetrating section 423 bent from the connecting section 422 and extending in the same direction as the first penetrating section 421. The first penetrating section 421 and the second penetrating section 423 pass through the two positioning holes 321 on the insulating member 3 respectively, and the connecting section 422 is positioned and exposed on the blocking portion 32 of the insulating member 3, wherein the connecting section 422 forms the first conductive portion 52 in FIG. 5. It should be further explained that the first engaging portion 51 of the lamp holder 5 is connected to the light-emitting portion 53 via a conductive sheet 42*a* embedded in the lamp holder 5 and a negative wire 92, and the first conductive portion 52 is connected to the light-emitting portion 53 by a positive wire 93.

Figure 7:
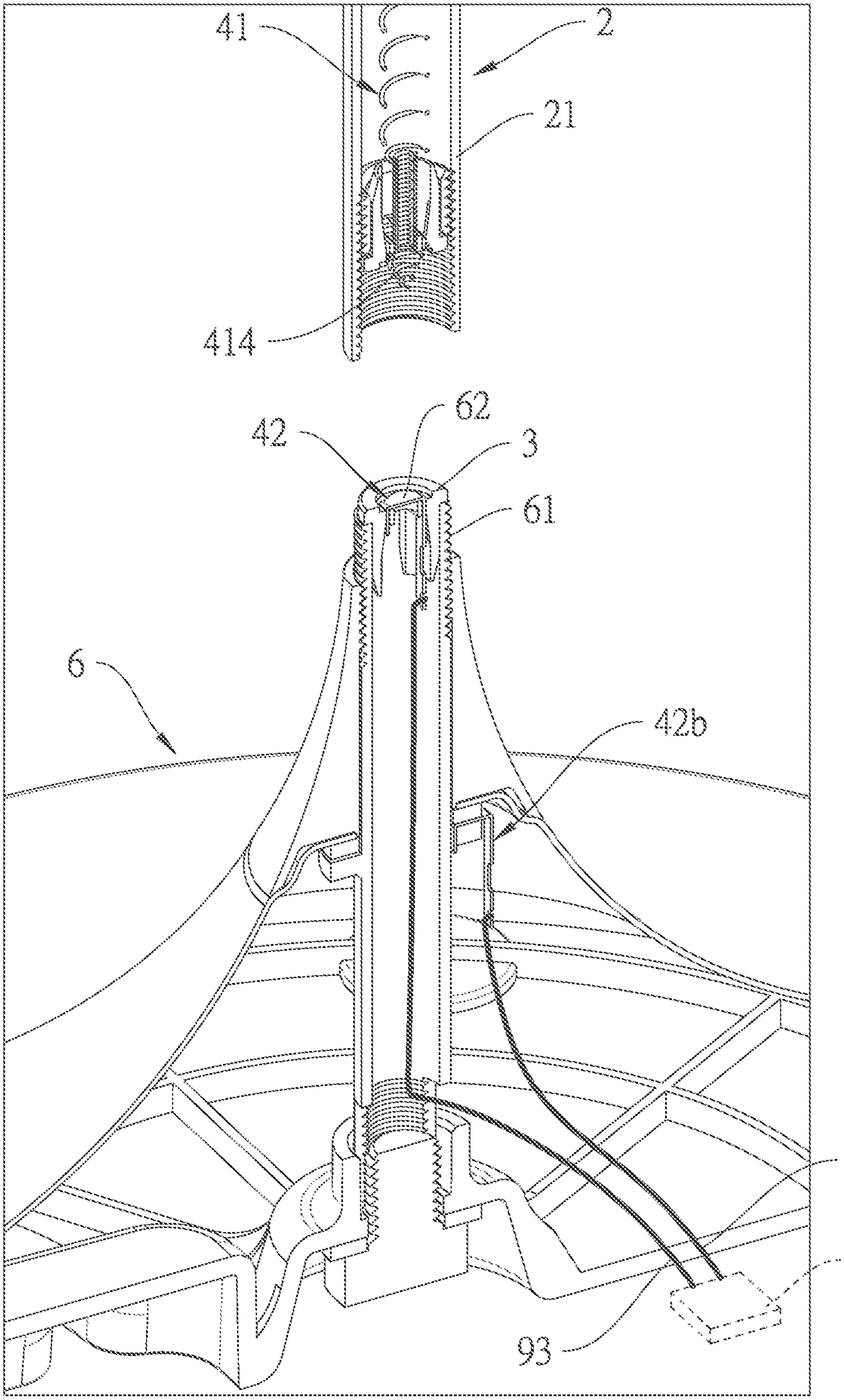
FIG. 7 is an exploded diagram illustrating the combination of the conductive rod and a base.

Referring to FIG. 7, the base 6 includes a second engaging portion 61 detachably connected to the other end of the outer tube unit 2 and made of conductive material, a second conductive portion 62 located inside the second engaging portion 61, and a circuit board 63 electrically connected to the second engaging portion 61 and the second conductive portion 62. The second engaging portion 61 and the second conductive portion 62 are not in contact with each other. More specifically, the second engaging portion 61 is a metal tube, and the end of the second engaging portion 61 is installed with the insulating member 3 and the conductive sheet 42 as shown in FIG. 6. Therefore, the second engaging portion 61 is not conductive with the second conductive portion 62 due to the insulating properties of the insulating member 3. The conductive sheet 42 also forms the second conductive portion 62 with its connecting section 422 as mentioned above. It should be noted that, the second engaging portion 61 is also connected to the circuit board 63 by a conductive sheet 42*b* embedded in the base 6 and a negative wire 92, and the second conductive portion 62 is connected to the circuit board 63 by a positive wire 93.

Referring to FIG. 5, when the lamp holder 5 is combined with the outer tube unit 2, the first engaging portion 51 of the lamp holder 5 will be screwed in one end of the hollow tube body 21 with its external thread. At this time, the first conductive portion 52 of the lamp holder 5 will press the tapered portion 414 and conduct with the conductive strip 41. Referring to FIG. 7, when the base 6 is combined with the outer tube unit 2, the second engaging portion 61 of the base 6 is screwed in the other end of the hollow tube body 21, and the second conductive portion 62 of the base 6 will press the other tapered portion 414 and conduct with the conductive strip 41 at the same time. Since the hollow tube body 21, the first engaging portion 51 of the lamp holder 5, and the second engaging portion 61 of the base 6 are all made of conductive materials, when the lamp holder 5 and the base 6 are combined with the conductive rod 1, the hollow tube body 21, the first engaging portion 51, and the second engaging portion 61 are conducted to serve as a negative electrode, or commonly known as "earth wire". In addition, the first conductive portion 52 of the lamp holder 5, the conductive strip 41, and the second conductive portion 62 of the base 6 are also conducted to serve as positive electrode, or commonly known as "live wire". The insulating member 3 is used as an insulating structure between the positive circuit and the negative circuit to avoid conduction.

The conductive unit 4 conduct with other component (such as a lamp holder, a base, a conductive rod) through the positioning section 412 protruding from the insulating member 3. In a preferred embodiment of the present invention, the positioning section 412 of the conductive unit 4 includes a tapered portion 414 protruding from the insulating member 3, and the tapered portion 414 is in a spiral type. Therefore, when the conductive rod 1 is screwed with the lamp holder 5 or the base 6, the tapered portion 414 is compressed to be pressed against the conductive sheet 42*a* of the lamp holder 5 or the conductive sheet 42*b* of the base 6. Moreover, the spiral type of the tapered portions 414 will not overlap when being compressed, so it can increase the contact area with the lamp holder 5 or the base 6 to achieve a better conducting performance.

As shown in FIG. 1, FIG. 5 and FIG. 7, by the above-mentioned structural design, the base 6, the conductive rod 1, and the lamp holder 5 can form a conduction state as long as they are screwed together tightly. There is no need to set additional wires inside, and no wires will be exposed outside. For the manufacturer, during the assembly process of the conductive rod 1, as long as the insulating members 3 are installed on both sides of the conductive strip 41, the conductive strip 41 is inserted through the hollow tube body 21, and the insulating members 3 are positioned on the positioning members 22 on both ends of the hollow tube body 21, the assembly process is completed. For consumers, as long as the base 6 and the lamp holder 5 are screwed in both ends of the conductive rod 1, the assembly is completed. The assembly process is simplified both for producers and consumers. In addition, the detachable structure design can also reduce the packaging volume and the transportation cost effectively.

It should be noted that, in the first preferred embodiment of the lamp of the present invention, a conductive series connection assembly is disclosed for conducting a first series connection unit and a second series connection unit. For example, the first series connection unit and the second series connection unit can be applied to the conduction between the lamp holder 5 and the conductive rod 1 as shown in FIG. 5 or applied to the conduction between the base 6 and the conductive rod 1 in FIG. 7. In another preferred embodiment, the first series connection unit and the second series connection unit can also be applied to the conduction of two conductive rods 1.

In the first preferred embodiment mentioned above, only one conductive rod 1 is used to connect the base 6 and the lamp holder 5 to form a lamp with a lower height, such as a desk lamp. If a lamp with a higher height is needed, such as a standing lamp, multiple conductive rods 1 are connected in series.

Figure 8:
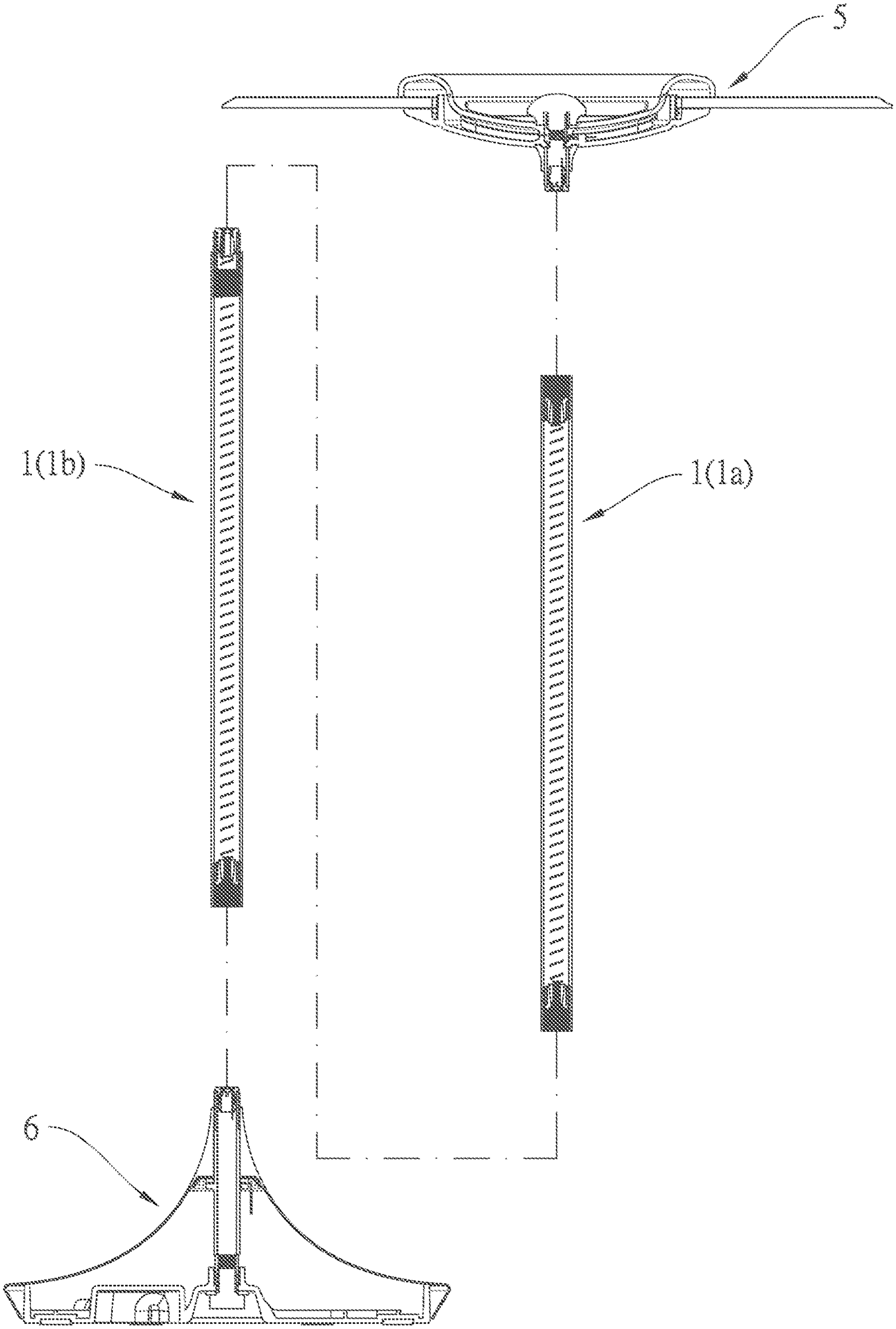
FIG. 8 is an exploded diagram of a lamp according to a second embodiment of this invention.

Referring to FIG. 8, it is a second preferred embodiment of the lamp of the present invention, comprises a plurality of conductive rods 1 connected in series, a lamp holder 5 combined with the top of the upmost conductive rod 1, and a base 6 combined with the bottom of the lowest conductive rod 1. Among the conductive rods 1, the structure of the conductive rod 1*a* is the same as that disclosed in FIG. 2, while the structure of the conductive rod 1*b* is slightly different.

Figure 9:
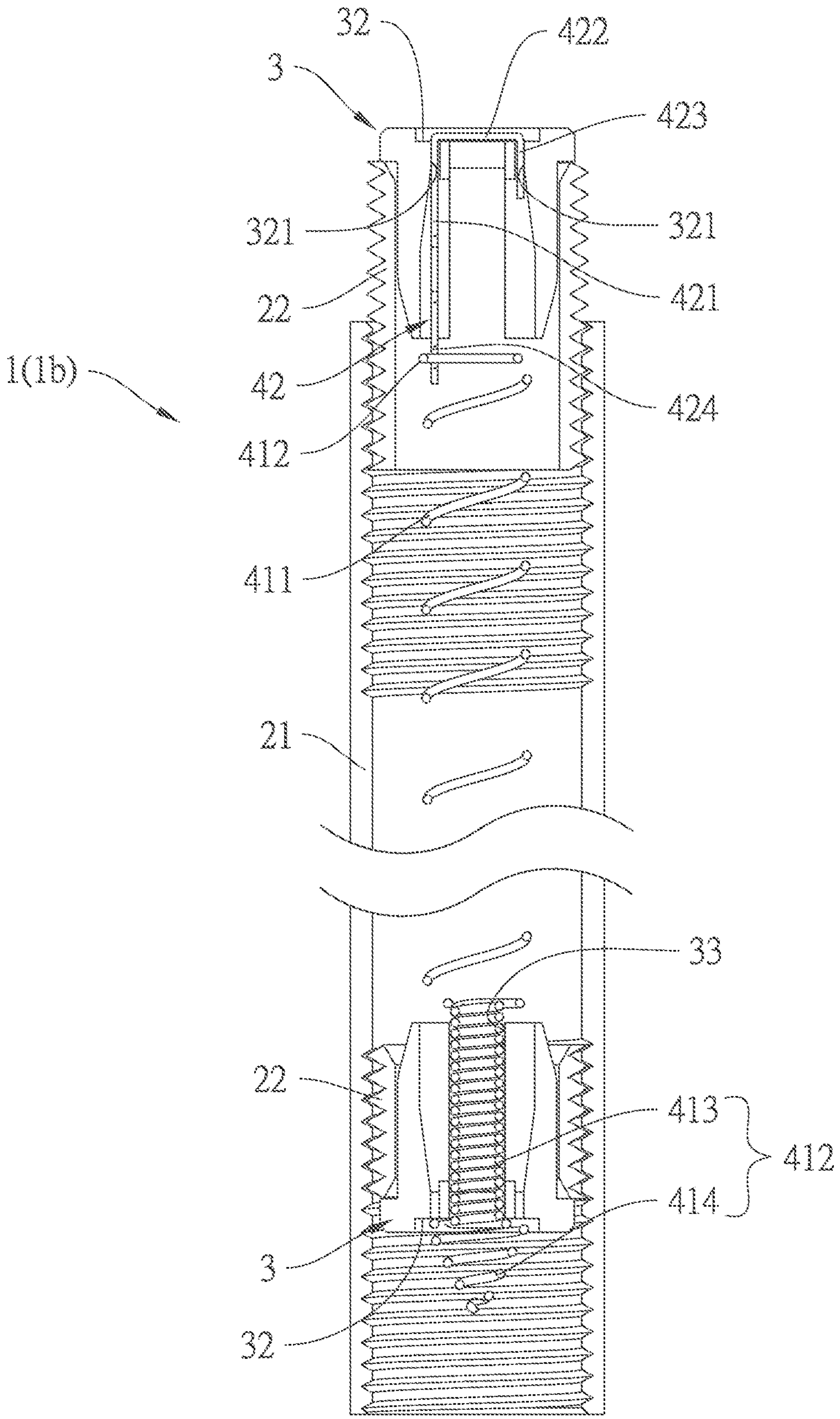
FIG. 9 is a cross-sectional diagram illustrating the structure of another type of the conductive rod.

As shown in FIG. 9, the conductive rod 1*b* also includes an outer tube unit 2 made of a conductive material, two insulating members 3 disposed at both ends of the outer tube unit 2 respectively, and a conductive unit 4 extending through the outer tube unit 2. The outer tube unit 2 includes a hollow tube body 21 and two positioning members 22 disposed at both ends of the hollow tube body 21. The insulating members 3 are disposed on the positioning members 22 respectively. Both ends of the hollow tube body 21 includes internal threads, and each of the positioning member 22 includes external thread. Therefore, the positioning members 22 are able to adjust their position relative to the hollow tube body 21 by screwing in the hollow tube body 21. One of the positioning members 22 is located inside the hollow tube body 21, and the other positioning member 22 is protruded from one end of the hollow tube body 21. The structure of the insulating member 3 is the same as that shown in FIG. 3 and will not be repeated here.

The difference is that the conductive unit 4 disposed in the conductive rod 1*b* includes a conductive strip 41 and a conductive sheet 42. As shown in FIG. 6, the conductive sheet 42 has a first penetrating section 421, a connecting section 422 bent from the first penetrating section 421, and a second penetrating section 423 bent from the connecting section 422 and extending in the same direction as the first penetrating section 421, wherein the first penetrating section 421 has a through hole 424. The first penetrating section 421 and the second penetrating section 423 pass through the two positioning holes 321 of the insulating member 3 respectively, and the connecting section 422 is positioned and exposed on the blocking portion 32 of the insulating member 3.

The conductive strip 41 has a stretched section 411 and two positioning sections 412 connected to two ends of the stretched section 411 respectively. The positioning section 412, which located below in FIG. 9, has a neck portion 413 connected to the stretched section 411, and a tapered portion 414 connected to the neck portion 413 and protruding from the insulating member 3. The diameter of the neck portion 413 is smaller than the maximum diameter of the tapered portion 414. The neck portion 413 passes through the groove portion 33 of the insulating member 3, so that the tapered portion 414 abuts against the blocking portion 32 and is positioned on the insulating member 3. The diameter of the positioning section 412, which located above in FIG. 9, is the same as that of the stretched section 411, and its end is hooked directly to the hole 424 of the first penetrating section 421 to be positioned on the conductive sheet 42. It should be noted that, in this embodiment, the lower positioning member 22 is located inside the hollow tube body 21, and the upper positioning member 22 is protruding from one end of the hollow tube body 21. The length of the positioning members 22 can be changed as required. With this structure design, the positioning section 412 of the conductive strip 41 with the tapered portion 414 is located in the hollow tube body 21 to form a female engagement, and the other positioning section 412 protrudes outside the hollow tube body 21 form a male engagement. Therefore, the two ends of the conductive rod 1*b* become a male engagement and a female engagement respectively.

As shown in FIG. 8, the conductive rod 1*a* and conductive rod 1*b* can be connected in series with the lamp holder 5 and the base 6 respectively by the connection of the conductive rod 1*b* with male engagement and female engagement to the conductive rod 1*a* with both female engagements. In other embodiment, the joint of the lamp holder 5 or the base 6 can also be replaced with the structure of the female engagement, which can connect directly in series with the conductive rod 1*b* having male and female engagements.

In this preferred embodiment, by the structural design of the conductive rod 1*b* having male and female engagements, a plurality of the conductive rods 1*b* can connect directly in series, and the length can be changed as required.

It should be noted that, in the previous embodiments, it can be regarded as a conductive series connection between the conductive rod 1 and the lamp holder 5, between the conductive rod 1 and the base 6, and between the conductive rods 1 engaged with each other. The structures of the male and female engagements are formed by the method described in each embodiment, which is convenient for quick connection, and then the metal outer tube is connected to each other to form a negative electrode, and the inner conductive strip 41 and the conductive sheet 42 are connected to each other to form a positive electrode. Therefore, the components mentioned above can be conducted on as long as they are in contact with each other.

Therefore, the lamp of the present invention has the following characteristics:

1. The product is easy to assemble for the production line: the hollow tube body 21, the positioning member 22, the insulating member 3, the conductive strip 41 and the conductive sheet 42 of each conductive rod 1 can be assembled quickly and conveniently, so as to reducing the assembly cost of the production line.
2. The product is easy to transport: the conductive rod 1, the base 6, and the lamp holder 5 are detachable design, which can reduce the packaging volume, the packaging material, and the transportation cost. It is more environmentally friendly.
3. Modular design: consumers only need to screw the conductive rod 1, the base 6, and the lamp holder 5 together to complete the assembly and conduction, which not only reduce the exposed wires but also avoid pulling down by the exposed wires and improve the overall visual appearance.

What is claimed is:

1. A conductive rod, comprising:

an outer frame unit;

an outer tube unit, which is made of conductive material and has a first end and a second end, wherein the first end and the second end communicate with a tube space;

at least one insulating member disposed at the first end of the outer tube unit; and a conductive unit, wherein one end of which is positioned on the insulating member, the other end of which extends toward the second end along the tube space of the outer tube unit, and the conductive unit is not in contact with the outer tube unit, wherein the insulating member has a sleeve portion and a blocking portion located at one end of the sleeve portion, wherein the sleeve portion forms an inner space around an axial direction, and the conductive unit extends into the inner space and is positioned on the insulating member, and wherein the insulating member has a groove portion recessed along a radial direction of the sleeve portion and the blocking portion, and the groove portion is for the conductive unit passing through.

2. The conductive rod as claimed in claim 1, wherein the conductive unit includes a conductive strip with a stretched section and at least one positioning section connected to an end of the stretched section, wherein the stretched section of the conductive strip passes through the groove portion of the insulating member so that the positioning section is positioned on the blocking portion, and the end of the positioning section protruding from the insulating member along the axial direction of the sleeve portion.

3. The conductive rod as claimed in claim 2, wherein the positioning section of the conductive strip has a neck portion connected to the stretching section, and a tapered portion connected to the neck portion and protruding from the insulating member, wherein the diameter of the neck portion is smaller than the maximum diameter of the tapered portion, the neck portion penetrates the groove portion, and the tapered portion abuts against the blocking portion and tapers away from the neck portion to form a tapered shape.

4. The conductive rod as claimed in claim 1, wherein the conductive unit further includes at least one conductive sheet, and the blocking portion of the insulating member has at least one positioning hole, the conductive sheet is inserted into the positioning hole and a part of the conductive sheet is exposed on the blocking portion.

5. The conductive rod as claimed in claim 4, wherein the conductive strip has a stretched section and a positioning section connected to one end of the stretched section, the conductive sheet has a first penetrating section extending through the positioning hole, and a connecting section bent from the first penetrating section and positioned at the blocking portion, the first penetrating section has a hole, and the positioning section of the conductive strip is hooked through the hole of the first penetrating section.

6. The conductive rod as claimed in claim 5, wherein the blocking portion of the insulating member has another positioning hole, the conductive sheet further has a second penetrating section bent from the connecting section and extending along the same direction as the first penetrating section, wherein the first penetration section and the second penetration section pass through the two positioning holes respectively.

7. The conductive rod as claimed in claim 1, wherein the outer tube unit includes a hollow tube body, and at least one positioning member disposed on the hollow tube body, the insulating member further has a protruding wall portion extending outward along a radial direction of the blocking portion, the insulating member is combined with the positioning member, and the protruding wall portion abuts against the positioning member.

8. The conductive rod as claimed in claim 7, wherein the hollow tube body is formed with an inner thread, and the positioning member is formed with an outer thread, and the positioning member is able to adjust its position relative to the hollow tube body by screwing in the hollow tube body.

9. A lamp, comprising at least one conductive rod as described in claim 1, wherein a lamp holder combined with a top of the conductive rod, and a base combined with a bottom of the conductive rod.

10. The lamp as claimed in claim 9, wherein the lamp holder includes a first engaging portion which is detachably combined with one end of the outer tube unit and is made of conductive material, a first conductive portion located inside the first engaging portion and capable of being electrically connected to the conductive unit of the conductive rod, and a light-emitting portion electrically connected to the first engaging portion and the first conductive portion, wherein the first engaging portion and the first conductive portion are not in contact with each other.

11. The lamp as claimed in claim 9, wherein the base includes a second engaging portion which is detachably combined with one end of the outer tube unit and is made of conductive material, a second conductive portion located inside the second engaging portion and capable of being electrically connected to the conductive unit of the conductive rod, and a circuit board electrically connected to the second engaging portion and the second conductive portion, the second engaging portion and the second conductive portion are not in contact with each other.

12. A conductive series connection assembly for conducting a first series connection unit and a second series connection unit, wherein:

the first series connection unit comprising:

a first casing made of conductive material and having a first end;

a first insulating member disposed on the first end of the first casing and having a blocking portion; and a first conductive member connected to the first insulating member and positioned on the blocking portion, and the first conductive member is not in contact with the first casing; and the second series connection unit comprising:

a second casing made of conductive material and having a second end;

a second insulating member disposed on the second end of the second casing; and a second conductive member having a stretched section and at least one positioning section connected to the end of the stretched section, wherein the end of the positioning section is connected to the second insulating member, and the second conductive member is not in contact with the second casing;

wherein, the first insulating member located at the first end of the first casing is combined with the second end of the second casing, and a part of the first conductive member located on the blocking portion of the first insulating member is in contact with the positioning section of the second conductive member located at the second end of the second casing; and wherein the second insulating member has a blocking portion, the positioning section of the second conductive member has a tapered portion, the tapered portion protrudes from the blocking portion of the second insulating member, and the blocking portion of the first insulating member presses the tapered portion of the second conductive member so that the tapered portion can be compressed.

* * * * *